United States Patent
Chen et al.

(10) Patent No.: US 8,259,358 B2
(45) Date of Patent: Sep. 4, 2012

(54) APPARATUS FOR ELIMINATING MOIRE IN SCANNED IMAGE AND METHOD FOR THE SAME

(75) Inventors: Chen-Chung Chen, Tao Yuan Hsien (TW); Cheng-Huei Chiang, Tai Chung Hsien (TW)

(73) Assignee: Muller Capital, LLC, Wilmington, DE (US)

( * ) Notice: Subject to any disclaimer, the term of this patent is extended or adjusted under 35 U.S.C. 154(b) by 780 days.

(21) Appl. No.: 11/979,650

(22) Filed: Nov. 7, 2007

(65) Prior Publication Data

US 2008/0063297 A1    Mar. 13, 2008

Related U.S. Application Data

(62) Division of application No. 10/394,035, filed on Mar. 24, 2003, now Pat. No. 7,342,688.

(30) Foreign Application Priority Data

Oct. 18, 2002  (TW) ................................ 91124145 A

(51) Int. Cl.
*G06K 15/00* (2006.01)
*G06K 9/40* (2006.01)

(52) U.S. Cl. ...... 358/3.03; 358/1.9; 358/3.04; 358/3.05; 358/3.06; 358/3.13; 358/3.26; 358/534; 358/465; 358/466; 382/252; 382/251; 382/237; 382/275

(58) Field of Classification Search .................. 382/275, 382/251, 252, 260, 172, 167, 165, 237, 3.04, 382/3.26, 1.9, 2.1, 1.8, 3.03, 3.05, 3.13, 505, 382/534, 401, 112, 268, 299; 358/3.04, 3.26, 358/1.9, 2.1, 1.8, 3.03, 3.05, 3.13, 3.16, 505, 358/534, 401

See application file for complete search history.

(56) References Cited

U.S. PATENT DOCUMENTS

| | | | |
|---|---|---|---|
| 5,351,137 A | | 9/1994 | Kato et al. |
| 5,458,492 A | * | 10/1995 | Holguin ........................ 434/153 |
| 5,469,276 A | * | 11/1995 | Shu ............................... 358/534 |
| 5,592,592 A | | 1/1997 | Shu |
| 5,737,453 A | * | 4/1998 | Ostromoukhov ............. 382/275 |
| 5,937,090 A | * | 8/1999 | Kim ............................... 382/169 |
| 6,178,267 B1 | * | 1/2001 | Sato et al. ..................... 382/252 |
| 6,458,492 B1 | * | 10/2002 | Kraft ................................. 430/4 |
| 7,057,773 B2 | | 6/2006 | Ilbery |
| 7,342,688 B2 | | 3/2008 | Chen et al. |
| 2002/0172412 A1 | * | 11/2002 | Jun et al. ....................... 382/149 |

FOREIGN PATENT DOCUMENTS

TW           220504        8/2004

* cited by examiner

*Primary Examiner* — Steven Kau

(57) ABSTRACT

A method for eliminating moire in scanned digital image comprises the steps of using an average circuit for taking weighted average and error diffusing a gray level difference between an error diffusion pixel $G_{ij}$ and neighbor pixels to neighbor to obtain output image pixel $Y'_{ij}$; using a second adder for subtracting the error diffusion pixel $G_{ij}$ from the output image pixel $Y'_{ij}$ to obtain a neighbor image error $d_{ij}$; using a error filter $H(z)$ to process the neighbor image error $d_{ij}$ to obtain a corrected pixel error $H(d(i,j))$; and using a first adder for adding the corrected pixel error $H(d(i,j))$ and the input image pixel $Y_{ij}$ to obtain the corrected error diffusion pixel $G_{ij}$, and then jumping to first step until all pixels being processed. The method provides real time treatment for eliminating moire and provide smooth image.

16 Claims, 4 Drawing Sheets

APPARATUS FOR ELIMINATING MOIRE IN SCANNED IMAGE AND METHOD FOR THE SAME

RELATED APPLICATIONS

This application is a Divisional patent application of application Ser. No. 10/394,035, filed 24 Mar. 2003 now U.S. Pat. No. 7,342,688.

FIELD OF THE INVENTION

The present invention relates to a method for eliminating moire in scanned image, especially to a method for eliminating moire in multiple function printer (MFP) or scanner to obtain better image quality.

BACKGROUND OF THE INVENTION

The multiple function printer (MFP) and scanner play essential role to produce hot copy image and digital image. To provide image with high fidelity, an image processing software is required to compensate the image obtained through the MFP and scanner.

FIG. 1 shows a prior art image processing method. The original document is scanned to obtain digitalized RGB data. The digitalized RGB data is subjected to a CMYK conversion, a half-tone treatment and a graphic-text enhancing treatment to obtain CMYK half-tone image. The CMYK half-tone image is printed by a printer module. As can be seen from the flowchart, the scanned image is processed by the CMYK conversion, the half-tone treatment and the graphic-text enhancing treatment to compensate the discrepancy between scanner and printer.

The half-tone treatment generally adopts order dither and error diffusion methods. The order dither increases gray level by decreasing the resolution of image, i.e., increases the coding point in a region for a specific color to increase the gray level for this color.

The error diffusion method distributes the error during digitalizing the gray scale image to neighbor pixel. With reference to FIG. 2, the error diffusion method is implemented by a first adder 11, a quantizer circuit 12, a second adder 13 and an error filter 14, wherein $X_{ij}$ is input image pixel, $U_{ij}$ is error diffusion pixel, $X'_{ij}$ is output image pixel, $e_{ij}$ is neighbor image error, H(z) is error filter. The second adder 13 subtracts the error diffusion pixel $U_{ij}$ from the output image pixel $X'_{ij}$ to obtain the neighbor image error $e_{ij}$. The neighbor image error $e_{ij}$ is processed by the error filter H(z) 14 to obtain a corrected pixel error H(e(i,j)). The first adder 11 subtracts the corrected pixel error H(e(i,j)) from the input image pixel $X_{ij}$ to obtain the error diffusion pixel $U_{ij}$. It also means that the pixel error H(e(i,j)) is distributed to the neighbor pixels according to coefficients type of the error filter H(z). The error diffusion pixel $U_{ij}$ is compared with a threshold t in the quantizer circuit 12 to obtain digitalized output (0 or 1). A digital output 1 is obtained when the error diffusion pixel $U_{ij}$ is larger than the threshold t and a digital output 0 is obtained when the error diffusion pixel $U_{ij}$ is smaller than or equal to the threshold t. The error diffusion method distributes quantization error to neighbor pixel to compensate error between one pixel and neighbor pixel.

The conventional half-tone treatment such as order dither and error diffusion methods generally produces moire in scanned image. Therefore, post treatment such as mask method or frequency domain method such as Fourier transform is used to reduce the moire in scanned image. The about methods become time consuming and complicated when the moire frequently occur or occupies large area.

SUMMARY OF THE INVENTION

It is an object of the present invention to provide a method for fast eliminating moire in scanned image.

It is another object of the present invention to provide a method for eliminating moire in scanned image, wherein the weight for error diffusion treatment can be selected according to the complexity of moire.

It is still another object of the present invention to provide a method for eliminating moire in scanned image, which can perform real time treatment for MPF and scanner.

To achieve above object, the present invention provides a method for eliminating moire in scanned image, which comprises following steps:

(a). using an average circuit for taking weighted average and error diffusing a gray level difference between an error diffusion pixel $G_{ij}$ and neighbor pixels to neighbor pixels to obtain output image pixel $Y'_{ij}$;

(b). using a second adder for operating the output image pixel $Y_{ij}$ and the error diffusion pixel $G_{ij}$ to obtain a neighbor image error $d_{ij}$;

(c). using an error filter H(z) to process the neighbor image error $d_{ij}$ to obtain a corrected pixel error H(d(i,j)); and (d). using a first adder for operating the corrected pixel error H(d(i,j)) and the input image pixel $Y_{ij}$ to obtain the corrected error diffusion pixel $G_{ij}$, and then jumping to step (a) until all pixels being processed.

To achieve above object, the present invention provides an apparatus for eliminating moire in scanned image, which comprises: a first adder for inputting an image pixel, an average circuit to take weighted average for the image pixel and the neighbor pixels thereof, a second adder to add the output of the first adder and the average circuit to obtain a neighbor image error, and an error filter to distribute the gray level difference of the image pixel to neighbor pixels and then outputs to the first adder; wherein the first adder, operates the output of the error filter and the input image pixel to obtain the corrected image pixel. The average circuit takes average for neighbor corrected image pixel to obtain a corrected output image pixel.

The various objects and advantages of the present invention will be more readily understood from the following detailed description when read in conjunction with the appended drawing, in which:

DETAILED DESCRIPTION OF THE INVENTION

Figure 3:
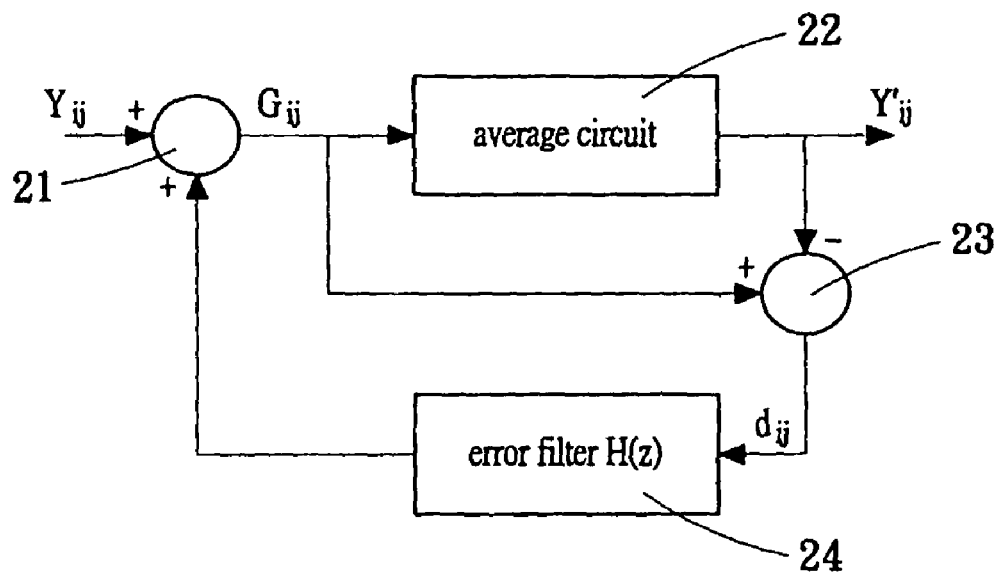
FIG. 3 shows a block diagram for implementing the method according to the present invention.

FIG. 3 shows a block diagram of a system for implementing the method for eliminating moire in digital image according to the present invention. The system comprises a first adder 21, an average circuit 22, a second adder 23 and an error filter 24, wherein $Y_{ij}$ is input image pixel, $G_{ij}$ is error diffusion pixel, $Y''_{ij}$ is output image pixel, $d_{ij}$ is neighbor image error.

The average circuit 22 diffuses the gray level difference to neighbor pixels instead of outputting binary value. The average circuit 22 takes weighted average for neighbor pixels to obtain output image pixel $Y'_{ij}$. The second adder 23 subtracts the error diffusion pixel $G_{ij}$ from the output image pixel $Y'_{ij}$ to obtain the neighbor image error $d_{ij}$. The neighbor image error $d_{ij}$ is processed by the error filter H(d) 24 to obtain a corrected pixel error H(e(i,j)).

The error filter H(d) distributes error to neighbor pixels according to following formula:

$$H(d) = \{d \times w_i + p, j + q . \text{vertline}. p = -n1, -n1+1, \ldots, n1'-1, n1' \text{ and } q = -n2, -n2+1, \ldots, n2'-1, n2'\},$$

wherein n1, n1', n2, n2' is natural number, and $\Sigma w_i + p, j + q = 1$.

The first adder 21 subtracts the corrected pixel error H(d(i,j)) from the input image pixel $Y_{ij}$ to obtain the corrected error diffusion pixel $G_{ij}$. The average circuit 22 takes weighted average for the corrected error diffusion pixel $G_{ij}$ and the neighbor pixels to obtain output image pixel $Y'_{ij}$. The average circuit 22 processes each pixel in an image to be processed.

Figure 4:
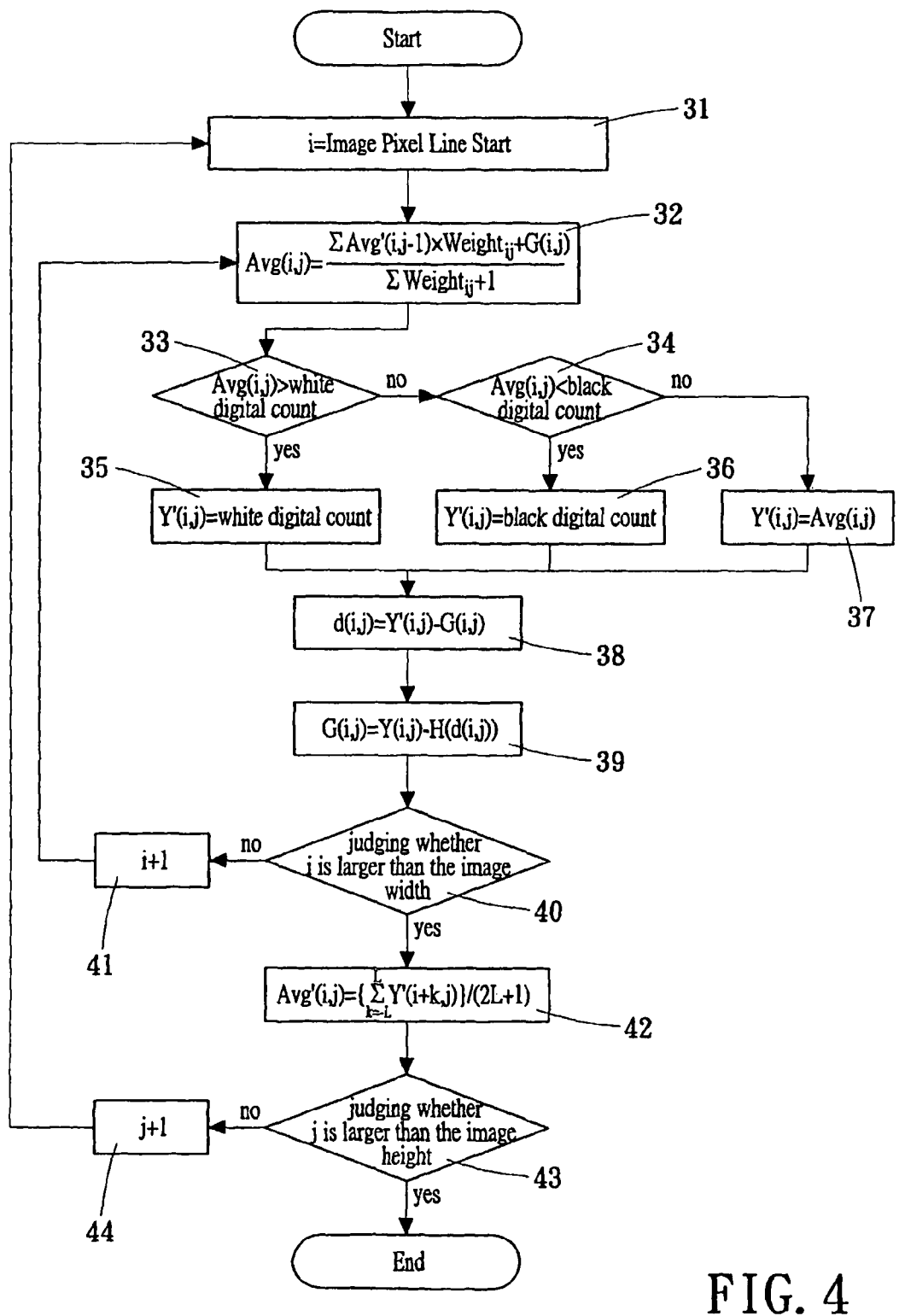
FIG. 4 shows a flowchart of method for eliminating moire in scanned image according to the present invention.
Figure 5:
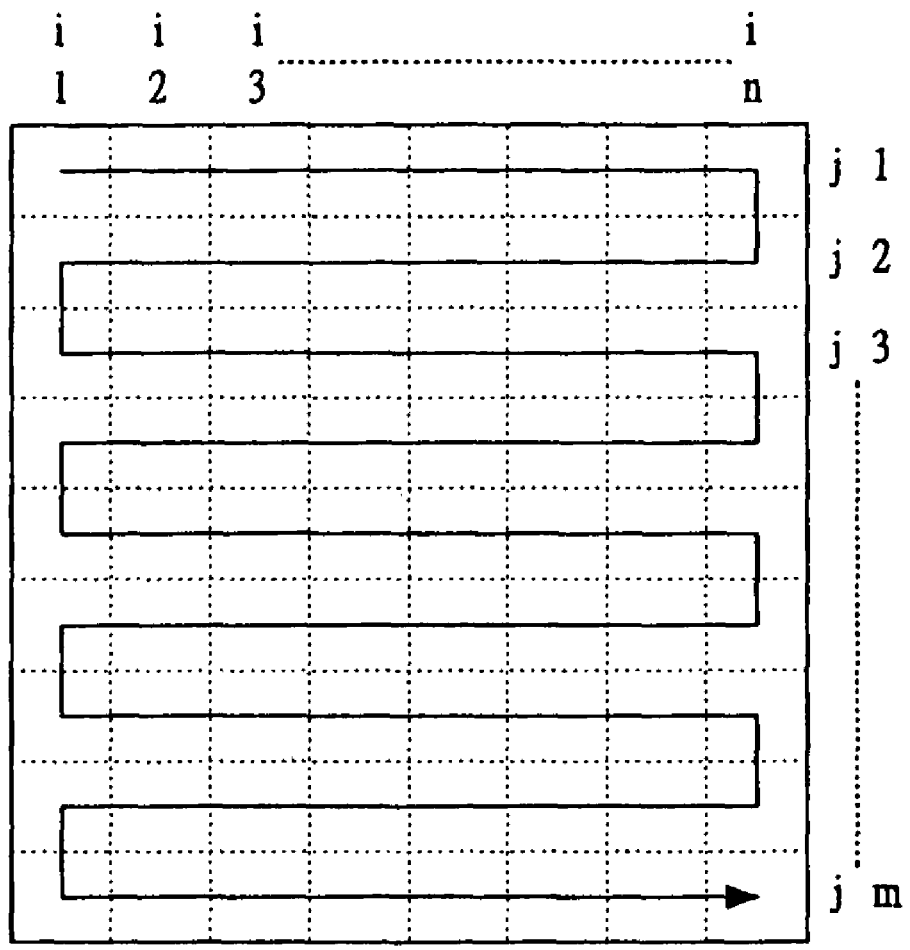
FIG. 5 is a schematic diagram for demonstrating the treatment of the present invention.

With reference to FIGS. 4 and 5, the image data in FIG. 5 is segmented to a plurality of lines and processed by the method shown in FIG. 3. The image shown in FIG. 5 is divided into a plurality of lines and the image is subjected to line-based treatment, wherein the image data has width n (represented by variable i) and height m (represented by variable j)

The process comprises following steps:

Step 31: processing from a beginning pixel i of a line of image;

Step 32: the average circuit 22 calculating the weighted average for neighbor pixels to obtain Avg(i,j); 1 Avg (i,j)=Avg (i,j−1) times. Weight ij+G (i,j) Weight ij+1

Step 33: judging whether Avg(i,j) is larger than white digital count (for 8-bit image, white digital count is 255), if true, going to step 35, else going to step 34;

Step 34: judging whether Avg(i,j) is less than black digital count (for 8-bit image, black digital count is 0), if true, going to step 36, else going to step 37;

Step 35: outputting the output image pixel $Y'_{ij}$ with value of white digital count;

Step 36: outputting the output image pixel $Y'_{ij}$ with value of black digital count;

Step 37: outputting the output image pixel $Y'_{ij}$ with Avg(i,j);

Step 38: the second adder 23 subtracting the error diffusion pixel $G_{ij}$ from the output image pixel $Y'_{ij}$ to obtain the neighbor image error $d_{ij}$;

Step 39: the first adder 21 subtracting the corrected pixel error H(d(i,j)) from the input image pixel $Y_{ij}$ to obtain the corrected error diffusion pixel $G_{ij}$;

Step 40: judging whether the beginning pixel i reaches the end of the line (i is larger than the image width n); if true, going to step 42, else going to step 41;

Step 41: adding 1 to i and returning to step 32 for processing next pixel;

Step 42: obtaining the average for pixels within a line length 2 L+1 to get an average value Avg'(i,j) for all pixels along the line, 2 Avg'(i,j)={K=−L L Y'(i+k,j)} (2 L+1)

wherein k is an incremental variable, L is the length for taking Gauss smoothing for right and left side pixel(s) of the pixel at position i, the maximal value of L is half of image width. To prevent fuzzy image, L is preferably 1-3.

then using the Avg(i,j) as reference value for the average circuit 22 for next line and then going to step 43;

Step 43: judging whether j reaches the bottom line of image (j is larger than the image height m); if true, ending the process, else going to step 44;

Step 44: adding 1 to j and processing image of next line.

As can be seen from above description, the method according to the present invention distributes the gray level difference of one pixel to neighbor pixels by a weight distribution according to the coefficients of the type of error filter. When a plurality of lines of image are sent to a buffer during a scanning operation of an MFP or a scanner, a system implemented by the method according to the present invention can process the lines of image stored in the buffer and then save the processed result in the buffer. The process according to the present invention is finished after the scanning operation is ended. The inherent moire in conventional half-tone treatment can be eliminated and smooth image can be obtained.

To sum up, the method for eliminating moire in scanned digital image according to the present invention has following advantages:

1. The weight for error diffusion treatment can be selected according to the complexity of moire. The eliminating effect is more prominent as weight is increased.

2. The method according to the present invention can perform real time treatment for MPF and scanner.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. An apparatus for eliminating moiré in a scanned digital image, the apparatus comprising:
   a first adder configured to receive an input image pixel and to add an error diffusion pixel to the input image pixel;
   an average circuit configured to take a weighted average of a gray level of the input image pixel and neighbor pixels thereof to obtain an output image pixel based at least in part on the weighted average of the gray level, wherein the weighted average of the gray level is based at least in part on a complexity of the moiré to be reduced;
   a second adder configured to subtract the error diffusion pixel from the output image pixel to obtain a neighbor image error; and
   an error filter configured to distribute a gray level difference of the input image pixel to the neighbor pixels and to process the neighbor image error to obtain a corrected pixel error and output the corrected pixel error to the first adder;
   wherein the first adder is configured to add the corrected pixel error to the input image pixel to obtain a corrected error diffusion pixel for processing of a subsequent input image pixel.

2. The apparatus of claim 1 wherein the gray level difference is based at least in part on the weighted average of the gray level.

3. The apparatus of claim 1, further comprising a buffer for storing the scanned digital image before and/or after processing the digital image with the average circuit.

4. The apparatus of claim 1 wherein at least one of the first adder, the average circuit, the second adder, and the error filter process a portion of the scanned digital image in real time.

5. The apparatus of claim 1 wherein the scanned digital image comprises a plurality of lines of image data, and wherein the first adder, the average circuit, the second adder, and the error filter sequentially process the plurality of lines of image data.

6. The apparatus of claim 1 wherein the average circuit is further configured to compare the weighted average of the gray level to one or more threshold values.

7. The apparatus of claim 6 wherein the one or more threshold values comprise at least one of a white digital count and a black digital count.

8. An apparatus for processing an image, the apparatus comprising:
   a first component configured to
   receive a corrected pixel error and a previous input image pixel; and add a multiple of the received previous corrected pixel error with a multiple of the previous input image pixel to obtain an error diffusion pixel;
   a second component configured to determine a weighted average of a gray level of an input image pixel and corresponding neighbor pixels, wherein the second component determines an output image pixel based at least in part on the weighted average of the gray level, and wherein the weighted average of the gray level is based at least in part on a complexity of the moiré to be reduced;
   a third component configured to add a multiple of the output image pixel with a multiple of the error diffusion pixel to obtain a neighbor image pixel;
   a fourth component configured to distribute a gray level difference of the input image pixel to the neighbor pixels and to process the neighbor image error to obtain a corrected pixel error; and
   a fifth component configured to update the corrected pixel error and the previous input image pixel in the first component for processing of a subsequent input image pixel.

9. The apparatus of claim 8 wherein the second component is an adder circuit that is configured to subtract the error diffusion pixel from the output image pixel to obtain the neighbor image pixel.

10. The apparatus of claim 8 wherein the gray level difference is based at least in part on the weighted average of the gray level.

11. The apparatus of claim 8 wherein the second component is further configured to compare the weighted average of the gray level to one or more threshold values.

12. The apparatus of claim 11 wherein the one or more threshold values comprise at least one of a white digital count and a black digital count.

13. An apparatus for reducing moiré of a scanned image, the apparatus comprising:
   Means for receiving a corrected pixel error and a previous input image pixel and adding a multiple of the received corrected pixel error with a multiple of the previous input image pixel to obtain an error diffusion pixel;
   means for taking a weighted average of a gray level of an input image pixel and corresponding neighbor pixels to produce an output image pixel based at least in part on the weighted average of the gray level, wherein the weighted average of the gray level is based at least in part on a complexity of the moiré to be reduced;
   means for adding a multiple of the error diffusion pixel with a multiple of the output image pixel to produce a neighbor image pixel;
   means for distributing a gray value difference of the input image pixel to the neighbor pixels and processing the neighbor image error to obtain a corrected pixel error; and
   means for updating the corrected pixel error and the input image pixel for processing of a subsequent input image pixel.

14. The apparatus of claim 13, wherein the gray value difference is based at least in part on the weighted average of the gray level.

15. The apparatus of claim 13, further comprising means for comparing the weighted average of the gray level to one or more threshold values.

16. The apparatus of claim 15 wherein the one or more threshold values comprise at least one of a white digital count and a black digital count.

* * * * *

UNITED STATES PATENT AND TRADEMARK OFFICE
CERTIFICATE OF CORRECTION

PATENT NO. : 8,259,358 B2
APPLICATION NO. : 11/979650
DATED : September 4, 2012
INVENTOR(S) : Chen et al.

It is certified that error appears in the above-identified patent and that said Letters Patent is hereby corrected as shown below:

Title Page, Item (54), in Title, in Column 1, Line 1, and in Specification, Column 1, Line 1, delete "MOIRE" and insert -- MOIRÉ --, therefor.

Title Page, Item (57), under "ABSTRACT", in Column 2, Line 1, delete "moire" and insert -- moiré --, therefor at each occurrence throughout the Patent.

In the Drawings

Figure 1:
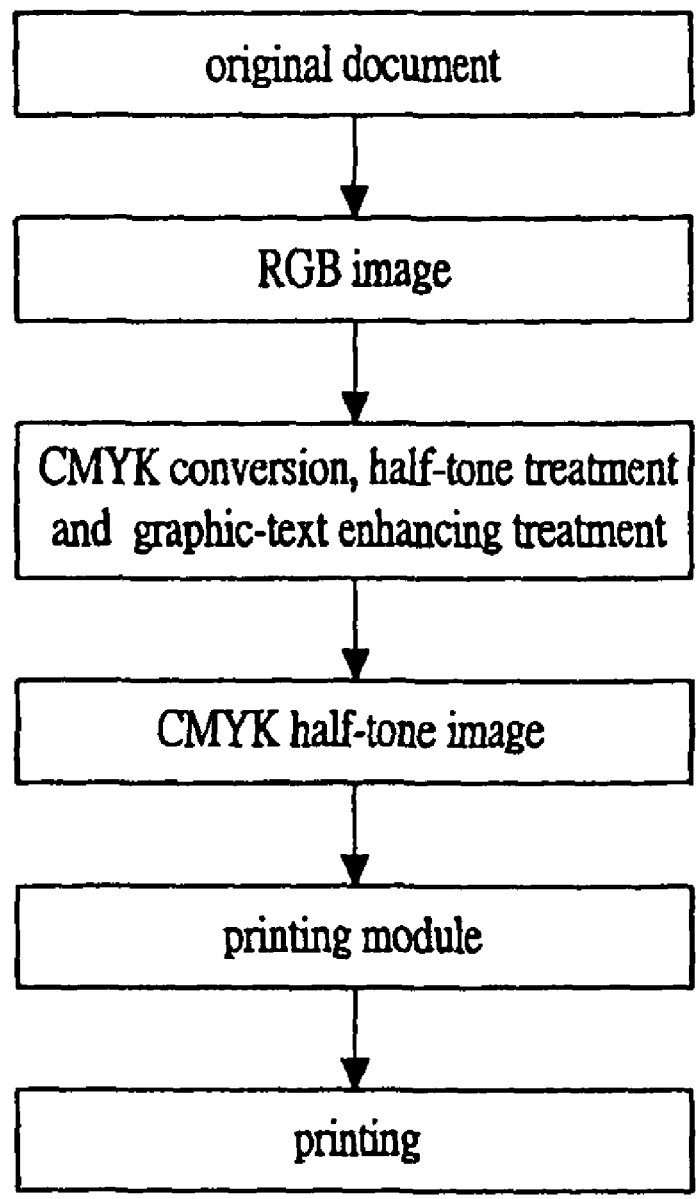
FIG. 1 shows a flowchart of prior art treatment for color printing.
Figure 2:
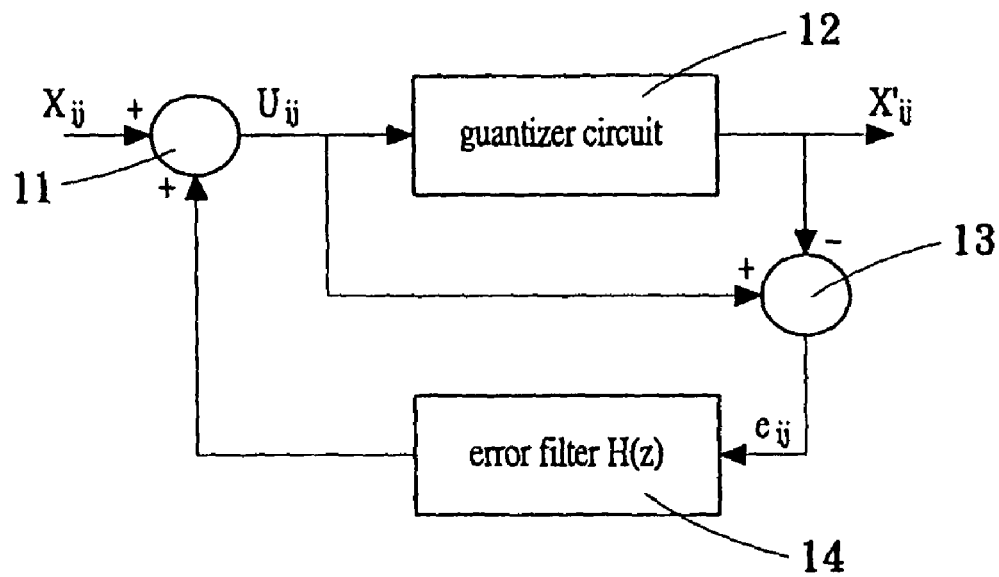
FIG. 2 shows a block diagram of prior art error diffusion treatment.

In Fig. 2, Sheet 2 of 4, for Tag "12", in Line 1, delete "guantizer" and insert -- quantizer --, therefor.

In the Specification

In Column 2, Line 14, delete "MPF" and insert -- MFP --, therefor.

In Column 3, Line 2, delete "$Y''_{ij}$" and insert -- $Y'_{ij}$ --, therefor.

In Column 3, Line 30, delete "variable j)" and insert -- variable j). --, therefor.

In Column 3, Line 36, delete "(i,j-1) times." and insert -- (i,j-1).times. --, therefor.

In Column 3, Line 36, delete "Weight ij+1" and insert -- Weight ij+1; --, therefor.

In Column 3, Line 61, delete "(2 L+1)" and insert -- (2 L+1), --, therefor.

In Column 4, Line 24, delete "MPF" and insert -- MFP --, therefor.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,259,358 B2

In the Claims

In Column 6, Line 12, in Claim 13, delete "Means" and insert -- means --, therefor.